(12) United States Patent
Cha et al.

(10) Patent No.: US 11,760,159 B2
(45) Date of Patent: Sep. 19, 2023

(54) VEHICLE AND BUILDING INTEGRATED AIR CONDITIONING SYSTEM AND CONTROL METHOD THEREOF

(71) Applicants: Hyundai Motor Company, Seoul (KR); Kia Motors Corporation, Seoul (KR)

(72) Inventors: Dong Eun Cha, Hwaseong-si (KR); Jin Ho Hwang, Cheonan-si (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 371 days.

(21) Appl. No.: 17/029,432

(22) Filed: Sep. 23, 2020

(65) Prior Publication Data
US 2021/0354527 A1 Nov. 18, 2021

(30) Foreign Application Priority Data

May 15, 2020 (KR) ........................ 10-2020-0058193

(51) Int. Cl.
*B60H 1/00* (2006.01)
*F24F 11/65* (2018.01)
*F24F 5/00* (2006.01)

(52) U.S. Cl.
CPC .......... *B60H 1/00778* (2013.01); *F24F 11/65* (2018.01); *F24F 5/0096* (2013.01)

(58) Field of Classification Search
CPC .......... F24F 11/65; F24F 5/0096; F24F 11/64; F24F 11/89; F24F 11/54; F24F 11/46;
(Continued)

(56) References Cited

U.S. PATENT DOCUMENTS 5,647,223 A * 7/1997 Wada ................... F24F 11/52
236/51
2006/0037319 A1 2/2006 Kaufman
(Continued)

FOREIGN PATENT DOCUMENTS

JP 2005-241080 9/2005
JP 2007-255094 10/2007
(Continued)

*Primary Examiner* — Christopher E. Everett
*Assistant Examiner* — Christopher W Carter
(74) *Attorney, Agent, or Firm* — MORGAN, LEWIS & BOCKIUS LLP

(57) ABSTRACT

A vehicle and building integrated air conditioning system which may communicate internal spaces with each other to integrally perform air conditioning when a vehicle is docked to a building, may include a vehicle which includes a control unit configured of controlling a vehicle control unit configured of controlling a vehicle air conditioning device, a building which includes a building control unit configured of controlling a building air conditioning device, is provided with a station to which the vehicle is docked, and communicates an interior of the building with the vehicle to perform air conditioning when the vehicle is docked to the station, and an integrated control portion which is configured to allow the vehicle control unit or the building control unit to integrally control the vehicle air conditioning device and the building air conditioning device.

18 Claims, 8 Drawing Sheets

(58) Field of Classification Search
CPC . F24F 11/56; B60H 1/00778; B60H 1/00257; B60H 1/00642; B60H 1/0073; B60L 53/00; B60R 16/033; Y02T 10/70; Y02T 10/7072; Y02T 90/14; H02J 7/0047; H02J 7/00712
See application file for complete search history.

(56) References Cited

U.S. PATENT DOCUMENTS

| | | | | |
|---|---|---|---|---|
| 2006/0064204 A1* | 3/2006 | Kim | ............. | F24F 11/56 700/276 |
| 2006/0155421 A1* | 7/2006 | Baek | ............. | G05D 1/0274 700/277 |
| 2012/0022702 A1* | 1/2012 | Jang | ............. | F24F 11/523 700/277 |
| 2019/0072293 A1* | 3/2019 | Kim | ............. | H04M 1/72412 |
| 2020/0166229 A1* | 5/2020 | Bentz | ............. | F25B 3/00 |

FOREIGN PATENT DOCUMENTS

| | | |
|---|---|---|
| JP | 2011-038365 | 2/2011 |
| JP | 5438430 B2 | 3/2014 |
| KR | 10-1498928 B1 | 3/2015 |
| KR | 102052346 B1 | 11/2019 |

\* cited by examiner

VEHICLE AND BUILDING INTEGRATED AIR CONDITIONING SYSTEM AND CONTROL METHOD THEREOF

CROSS REFERENCE TO RELATED APPLICATION

The present application claims priority to Korean Patent Application No. 10-2020-0058193 filed on May 15, 2020, the entire contents of which is incorporated herein for all purposes by this reference.

BACKGROUND OF THE DISCLOSURE

Field of the Invention

The present invention relates to a vehicle and building integrated air conditioning system and a control method thereof, in which internal spaces of the vehicle and the building fluidically-communicate with each other when the vehicle is docked and connected to the building, integrally performing air conditioning.

Description of Related Art

An air conditioning technology or Heating, Ventilation & Air Conditioning (HVAC) is a technology which integrates heating, cooling, and ventilation in a human living environment. A building is a space where a person lives or runs a business, and the construction of an air conditioning system of the building is a very important issue.

There is a trend that a vehicle is perceived as one living environment rather than a simple transportation means and the air conditioning system in the internal space of the vehicle is also a very important factor according to the change in the perception. The development of the air conditioning system may be essential for efficiently using the energy in the current situation where the paradigm is shifted from vehicles using internal combustion engines to electric vehicles or fuel cell vehicles.

In a future system where the vehicle and the building are connected to form a space, the integration of the air conditioning systems is essential. Until now, research and development has been focused on a hardware combination of the vehicle and the building and thus the development for constructing the air conditioning system is required.

The present invention is a disclosure relating to a world's first system in which the vehicle and the building may be connected to integrally perform the air conditioning through any one control unit.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a control method thereof, in which when a vehicle is docked and connected to a building, any one of a vehicle control unit or a building control unit may become a master to integrally manage the air conditioning for internal spaces of the building and the vehicle, and to charge a battery of the vehicle using a power supply device of the building.

For achieving the object, as a vehicle and building integrated air conditioning system which communicates internal spaces thereof with each other when a vehicle is docked to a building to integrally perform air conditioning, the present invention may include: a vehicle which includes a control unit configured of controlling a vehicle control unit configured of controlling a vehicle air conditioning device, a building which includes a building control unit configured of controlling a building air conditioning device, is provided with a station to which the vehicle is configured to be docked, and fluidically communicates an interior of the building with the vehicle to perform the air conditioning when the vehicle is docked to the station, and an integrated control portion which is configured to allow the vehicle control unit or the building control unit to integrally control the vehicle air conditioning device and the building air conditioning device.

When the vehicle is docked to the building, the integrated control portion may check a charge state of a battery of the vehicle, and may be connected to a power supply device of the building if the charge amount of the battery is equal to or less than a predetermined value to control to charge the battery.

The internal space of the building may be provided with a plurality of rooms which are partitioned into a plurality of spaces, the plurality of rooms may fluidically-communicate with each other so that air flows therebetween, and a first control valve is provided in the building so that the plurality of rooms may selectively fluidically-communicate with each other.

The integrated control portion may control opening and closing of the first control valve to adjust a room in which the air conditioning is performed among the plurality of rooms.

Outside wall of the station of the building may be provided with a sealing member which seals in contact with a frame of the vehicle to be docked.

The integrated control portion may set target temperatures of the internal spaces of the building and the vehicle, control so that the air conditioning is executed in a dual mode in which the vehicle air conditioning device and the building air conditioning device are simultaneously operated if differences between the target temperatures and current temperatures are set values or more by checking the current temperatures, and control so that the air conditioning is executed in a single mode in which one of the vehicle air conditioning device and the building air conditioning device is operated if the differences therebetween are the set values or less.

The integrated control portion may continuously check the current temperatures after the air conditioning is executed, stop operations of the vehicle air conditioning device and the building air conditioning device if the target temperatures and the current temperatures are the same as each other, and control so that the air conditioning is executed in the dual mode if the target temperatures and the current temperatures are different from each other.

The integrated control portion may control so that the air conditioning is executed by selecting an inside air circulation mode or an outside air circulation mode as an air conditioning mode of the vehicle.

The vehicle air conditioning device may include: an air door which selectively opens and closes an outside air inlet and an inside air inlet, and the integrated control portion may control the air door to select the inside air circulation mode in a cooling mode, and select the outside air circulation mode in a heating mode.

The integrated control portion may continuously check the current temperatures after the air conditioning is executed, and control so that the vehicle air conditioning device is operated in the inside air circulation mode if the target temperatures and the current temperatures are the same as each other.

The vehicle air conditioning device may include: a flow path which supplies air-conditioned air to the station, and a second control valve which opens and closes the flow path may be provided on the flow path.

Furthermore, the integrated control portion may control so that any one of the vehicle control unit or the building control unit becomes a master which is authorized to integrally control the vehicle air conditioning device and the building air conditioning device, and control so that the other one of the vehicle control unit or the building control unit becomes a slave which is not authorized to control the vehicle air conditioning device and the building air conditioning device.

Furthermore, as a control method of a vehicle and building integrated air conditioning system, the present invention may include: checking a connection in which whether the vehicle is connected to the building is checked, when the vehicle is docked to a building, selecting an air conditioning mode of the vehicle as an inside air circulation mode or an outside air circulation mode, measuring a temperature which measures current temperatures by checking a temperature of the building and a temperature of a room of the building to be used, determining the temperature which determines whether differences between target temperatures and the current temperatures are a set value or more by comparing the target temperatures with the current temperatures, and executing air conditioning which executes the air conditioning in a dual mode in which a vehicle air conditioning device and a building air conditioning device are simultaneously operated if the differences between the target temperatures and the current temperatures are the set values or more, and executes the air conditioning in a single mode in which one of the vehicle air conditioning device and the building air conditioning device is operated if the differences therebetween are the set values or less.

The control method may further include: managing the temperature which stops the operations of the vehicle air conditioning device and the building air conditioning device if the target temperatures and the current temperatures are the same as each other, and executes the air conditioning in the dual mode if the target temperatures and the current temperatures are different from each other, after the executing of the air conditioning.

The vehicle air conditioning device may be controlled to operate in an inside air circulation mode if the target temperatures and the current temperatures are the same as each other in the managing of the temperature.

The control method may further include: checking a battery in which a charge state of the battery of the vehicle is checked after the checking of the connection, determining the charge amount of the battery which determines whether the charge amount of the battery is equal to or greater than a predetermined charge amount, and charging the battery by connecting a power supply device of the building with the battery if the charge amount of the battery is the predetermined value or less.

Furthermore, the checking of the connection may include: selecting any one of the vehicle control unit or the building control unit as a master.

According to the vehicle and building integrated air conditioning system and the control method thereof according to various exemplary embodiments of the present invention, the integrated control portion may control any one of the vehicle control unit or the building control unit to become the master which grants the authority of integrally controlling the vehicle air conditioning device and the building air conditioning device to integrally manage the internal air conditionings of the vehicle and the building, efficiently using the energy and reducing the energy required for the air conditioning.

Furthermore, when the vehicle is docked to the building, the charge amount of the battery may be verified and the battery may be charged using a power supply device of the building, properly managing the charge amount of the battery of the electric vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
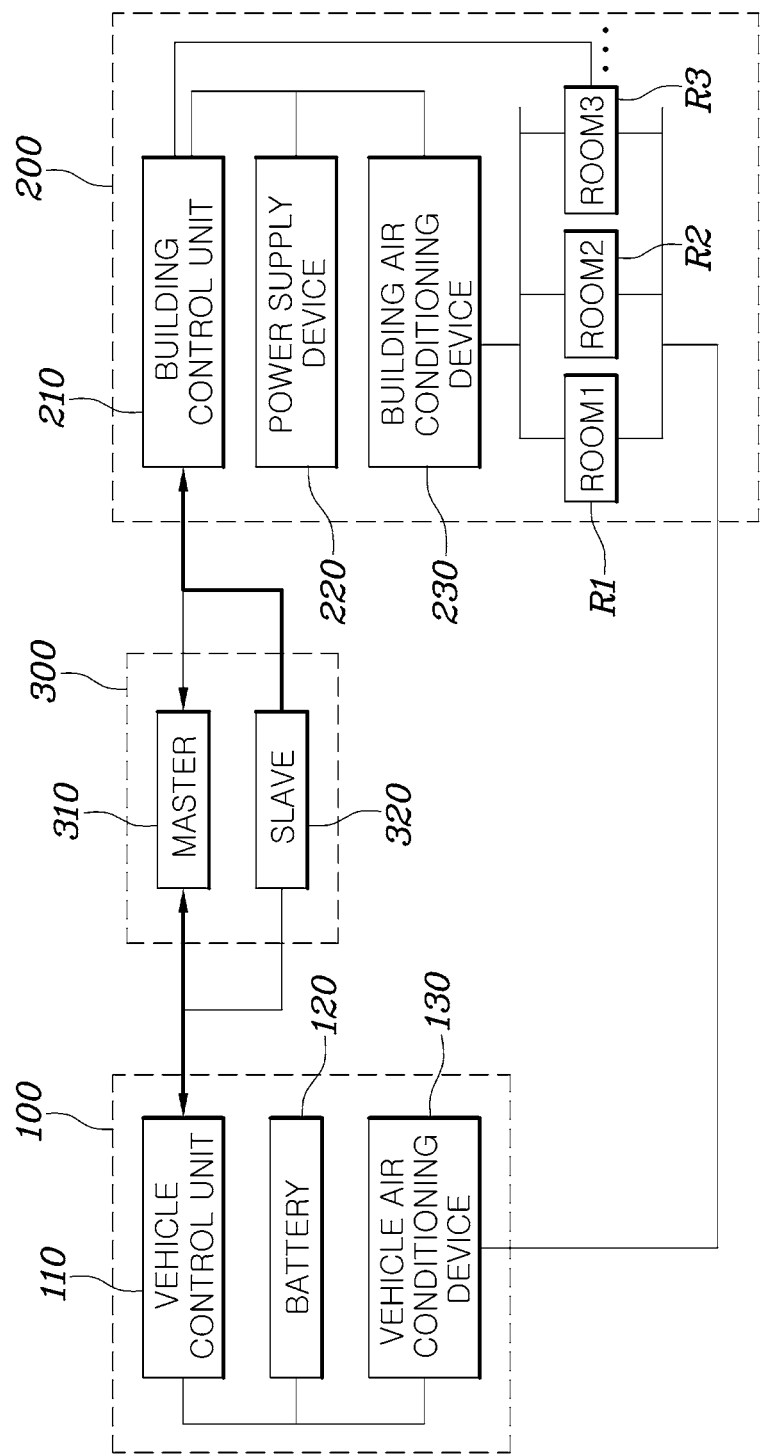
FIG. 1 is a block diagram illustrating a vehicle and building integrated air conditioning system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural to functional descriptions of the exemplary embodiments of the present invention included in the present specification or application are only illustrated for describing the exemplary embodiments according to various exemplary embodiments of the present invention, and the exemplary embodiments according to various exemplary embodiments of the present invention may be embodied in various forms and it may not be construed that the present invention is limited to the exemplary embodiments described in the present specification or application.

Since the exemplary embodiments according to various exemplary embodiments of the present invention may be variously changed and have various forms, specific exemplary embodiments will be illustrated in the drawings and described in detail in the present specification or application. However, this is not intended to limit the exemplary embodiments according to the concept of the present invention to a particular included form, and it may be understood that the present invention includes all changes, equivalents, and substitutes included in the spirit and scope of the present invention.

Terms such as first and/or second may be used to describe various components, but the components may not be limited by the terms. The terms are used only for distinguishing one component from another component, and for example, without departing from the scope according to the concept of the present invention, the first component may be named a second component, and similarly, the second component may also be named the first component.

When a component is referred to as being "connected" or "coupled" to another component, the component may be directly connected or coupled to another component, but it may be understood that other components may also be present between the components. Meanwhile, when a component is referred to as being "directly connected" or "directly coupled" to another component, it may be understood that there are no other components between the components. Other expressions which describe the relationship between the components, that is, "between" and "immediately between" or "neighboring" and "directly neighboring to" may be interpreted in the same manner.

Hereinafter, the present invention will be described in detail by explaining exemplary embodiments of the present invention with reference to the accompanying drawings. The same reference numerals in each drawing denote the same members.

The present invention is a disclosure relating to a vehicle 100 and building integrated air conditioning system and a control method thereof, which may integrally perform air conditioning rather than separately performing the air conditioning of the vehicle 100 and the building 200 to perform the air conditioning in the internal spaces in the vehicle 100 and the building 200 which are connected to fluidically-communicate with each other, implementing the efficient management and reducing energy.

FIG. 1 is a block diagram illustrating the vehicle 100 and building integrated air conditioning system according to various exemplary embodiments of the present invention. Referring to FIG. 1, the vehicle 100 and building integrated air conditioning system according to various exemplary embodiments of the present invention may be configured to include the vehicle 100, the building 200, and an integrated control portion 300.

The vehicle 100 and the building 200 in various exemplary embodiments of the present invention are connected to each other so that the internal spaces may fluidically-communicate with each other. That is, when the vehicle 100 is docked and connected to the building 200, there is no boundary between the internal spaces and thus the conditioned air may flow through the internal space of the vehicle 100 and the internal space of the building 200, integrally facilitating air conditioning.

The vehicle 100 may include a vehicle control unit 110, a battery 120, and a vehicle air conditioning device 130. The vehicle control unit 110 may confirm the charge state of the battery 120, and control an operation of the vehicle air conditioning device 130. The vehicle control unit 110 may perform the same function as a general vehicle electronic control unit (ECU) in a state where the vehicle 100 is not connected to the building 200. The battery 120 may provide driving energy and energy of operating the vehicle air conditioning device 130.

The building 200 may be configured to include a building control unit 210, a power supply device 220, a building air conditioning device 230, and a station 240. Furthermore, a plurality of rooms in which the internal space is partitioned may be provided in the building 200.

The building control unit 210 may control the building air conditioning device 230 by checking the temperature of the building 200, and checking a temperature of each of the plurality of rooms. The building control unit 210 may control the temperature for each area in a space being used by checking the entire temperature of the building 200 to check the temperature of a common space, and checking the temperature of each of the partitioned plurality of rooms.

The building air conditioning device 230 is a device which performs the air conditioning of the internal space. The building air conditioning device 230 is a device which is provided for the air conditioning in the internal space, such as an air conditioner, a heater, and an air purifier, and may be controlled by the building control unit 210. Furthermore, the building air conditioning device 230 may be provided for each of the plurality of rooms, to separately perform the air conditioning for each room. Accordingly, the room to be used may perform air conditioning to maintain comfortable conditions for human living, and the room not to be used may not perform air conditioning to save energy.

The power supply device 220 is a device which provides power to the building 200. As described later, the battery 120 may be charged by the power supply device 220.

The vehicle 100 may be docked to the station 240. The vehicle 100 may be the vehicle 100 which may be used for a specific purpose of the internal, such as purpose built vehicle (PBV). The station 240 is provided with a gate and the gate is closed if the vehicle 100 is not docked, and the gate is opened if the vehicle 100 is docked and thus the vehicle 100 and the building 200 may be connected to each other. The vehicle 100 and the station 240 may be provided in a standardized standard, and in the instant case, may be used universally. When the vehicle 100 is docked to the station 240, each room and the internal space of the vehicle 100 may directly fluidically-communicate with each other. Accordingly, the air conditioning of the room connected by the vehicle air conditioning device 130 is possible.

The integrated control portion 300 may perform a function of entirely controlling the integrated air conditioning system according to various exemplary embodiments of the present invention. The integrated control portion 300 may be electrically connected to the vehicle 100 and the building 200 to control the vehicle control unit 110 or the building control unit 210 to perform the air conditioning of the internal space.

The integrated control portion 300 may also directly control the vehicle air conditioning device 130 and the building air conditioning device 230 to perform the air conditioning, but control so that any one of the vehicle control unit 110 and the building control unit 210 becomes a master 310 which controls the integrated air conditioning system, and the other one of the vehicle control unit or the building control unit becomes a slave 320 which is waiting in a standby state.

The master 310 is authorized to integrally control the vehicle air conditioning device 130 and the building air conditioning device 230 to control the entire system, and the slave 320 is not authorized to control the vehicle air conditioning device 130 and the building air conditioning device 230 to wait in a standby state. If the master 310 is set, the air conditioning controls of the vehicle 100 and the building 200 are performed by the master 310, and if the master 310 is not set separately, the air conditioning controls may be performed by the integrated control portion 300.

Hereinafter, a case where the air conditioning control is performed based on a situation where the master 310 is set will be described, and the air conditioning control may be performed by the integrated control portion 300 if the master 310 is not set.

The master 310 may control a first control valve 250 which selectively communicates each room, and a second control valve 139 which selectively opens and closes a flow path through which air flows from the vehicle air conditioning device 130 to the building 200. Furthermore, the building air conditioning device 230 may be provided with a shut off valve which may open or close a ventilator, and the shut-off valve may be controlled by the master 310.

The master 310 may select an air conditioning mode, and the air conditioning mode may be a dual mode or a single mode, a cooling mode or a heating mode, which will be described later.

As illustrated in FIG. 1, when the vehicle control unit 110 becomes the master 310 and the building control unit 210 becomes the slave 320, the vehicle control unit 110 controls both the vehicle air conditioning device 130 and the building air conditioning device 230 to perform the integrated air conditioning, and the building control unit 210 becomes a standby state.

Furthermore, when the vehicle 100 is docked to the building 200, the integrated control portion 300 may check the charge state of the battery 120 of the vehicle 100. If the charge amount of the battery 120 is a predetermined value or less, the integrated control portion 300 may control to charge the battery 120 by the power supply device 220 of the building 200. The battery 120 may be charged regardless of whether the vehicle air conditioning device 130 is operated. That is, the vehicle air conditioning device 130 may be simultaneously operated while charging the battery 120.

Figure 2:
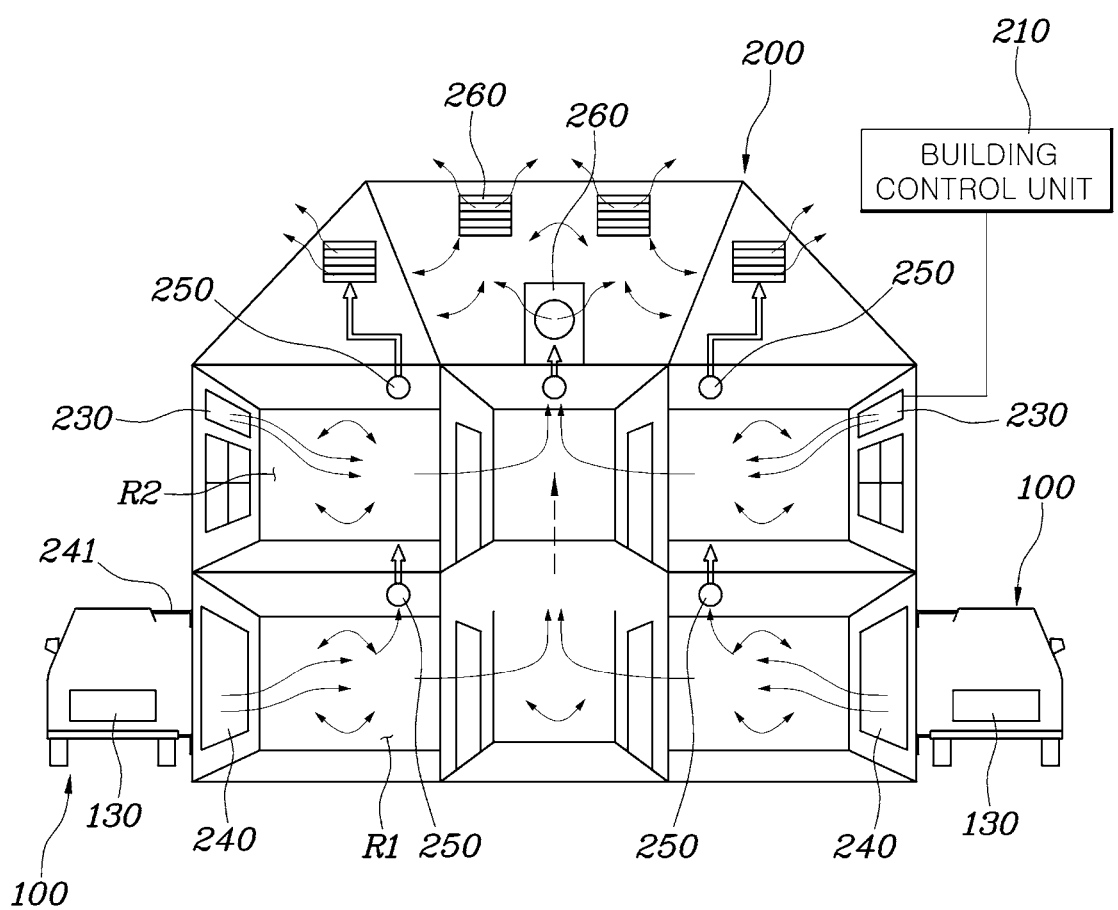
FIG. 2 is a diagram briefly illustrating a state where the vehicle and building integrated air conditioning system according to various exemplary embodiments of the present invention is operated.

FIG. 2 is a diagram briefly illustrating a state where the vehicle 100 and building integrated air conditioning system according to various exemplary embodiments of the present invention is operated.

Referring to FIG. 2, when the vehicle 100 is docked and connected to the station 240, the internal spaces of the vehicle 100 and the building 200 fluidically-communicate with each other to allow air to flow. The air conditioned by the vehicle air conditioning device 130 is introduced into each room to perform the air conditioning of the room. As illustrated in FIG. 2, each room may fluidically-communicate with each other so that air may flow therebetween, and a first control valve 250 may be provided on a communication flow path so that the plurality of rooms may selectively fluidically-communicate with each other.

When the first control valve 250 is closed, each room is independently distinguished from each other and does not fluidically-communicate with each other, so that air does not flow each other. When the first control valve 250 is opened, each room communicates with each other to allow air to flow, so that each room is a space which is structurally separated but the air conditioning of each room may be performed together.

The opening and closing control of the first control valve 250 may be performed by the master 310 in the integrated control portion 300. The master 310 may control the control valve so that the air conditioning is selectively performed only for the room used by a person, efficiently using energy.

Each room may be provided with the building air conditioning device 230 to perform air conditioning. In a state where the master 310 is not determined by the integrated control portion 300 of the building 200, the building air conditioning device 230 may be controlled by the building control unit 210. The air conditioned in each room flows into the common space, so that the common space may also be air-conditioned. Furthermore, the roof of the building 200 may be provided with a ventilator which allows outside air to flow into and out.

A sealing member which seals in contact with a frame of the vehicle 100 to be docked may be provided on the external wall of the station 240. The sealing member may be made of a flexible material to seal a gap without damaging a vehicle body. By securely sealing the external wall of the station 240 and the vehicle body, it is possible to protect a personal space. Noise may be shielded by the sealing member, and the inflow of dust may be blocked.

When the vehicle 100 is docked, the integrated control portion 300 may check a connection state. After checking the connection, the integrated control portion 300 connects any one of the vehicle control unit 110 or the building control unit 210 to the master 310, and connects the other one to the slave 320.

When the master 310 is determined, the master 310 may perform integrated air conditioning. The master 310 may set target temperatures of the internal spaces of the building 200 and the vehicle 100. When the target temperatures are set, the master 310 checks the current temperatures and compares the current temperatures with the target temperatures. If differences between the target temperatures and the current temperatures are set values or more, the master 310 may control to execute air conditioning in a dual mode in which the vehicle air conditioning device 130 and the building air conditioning device 230 are simultaneously operated. When the air conditioning is performed in the dual mode, the temperatures of the internal spaces reach the target temperatures within a short time.

On the other hand, if the differences between the target temperatures and the current temperatures are the set values or less, the master 310 may control to execute the air conditioning in a single mode in which only one of the vehicle air conditioning device 130 or the building air conditioning device 230 is operated. Since the current temperatures do not differ significantly from the target temperatures, energy may be used efficiently. The set value may be variably set as necessary, for example, may be set as 5° C.

After executing the air conditioning, the master 310 may continuously check the current temperatures of the internal spaces. If the detected current temperatures are the same as the target temperatures, the master 310 may stop the operations of the vehicle air conditioning device 130 and the building air conditioning device 230. Since the current temperatures in the internal spaces have reached the target temperatures, energy may be used efficiently, and additional heating and cooling may be prevented.

After executing the air conditioning, the master 310 may control to execute the air conditioning in the dual mode if the current temperatures and the target temperatures are different from each other. This is because it is necessary to execute strong air conditioning if the temperatures of the internal spaces do not reach the target temperatures even after a certain time elapses. The master 310 may control to execute the air conditioning in the dual mode to reach the target temperatures.

Even after the operation is stopped, the master 310 may continuously check the current temperature of the internal space. When the differences between the current temperatures and the target temperatures occur again, the master 310 may control to execute the air conditioning again in the dual mode or single mode depending on the temperature difference.

FIG. 3, FIG. 4, FIG. 5 and FIG. 6 are diagrams illustrating various air conditioning modes in the vehicle 100 and building integrated air conditioning system according to various exemplary embodiments of the present invention. Hereinafter, the air conditioning modes will be described in detail with reference to the drawings.

Referring to FIG. 3, FIG. 4, FIG. 5 and FIG. 6, the vehicle air conditioning device 130 may include an inside air inlet 133 through which air in the internal space is drawn, and an outside air inlet 132 through which air in the external space is drawn. An air door 131 may be provided between the inside air inlet 133 and the outside air inlet 132 to select an inside air circulation mode and an outside air circulation mode. When the air door 131 closes the outside air inlet 132, the inside air circulation mode is selected. When the air door 131 closes the inside air inlet 133, the outside air circulation mode is selected. When executing the air conditioning to detect that the target temperatures and the current temperatures are the same as each other, the master 310 may control the vehicle air conditioning device 130 to operate in the inside air circulation mode, saving energy.

Furthermore, a filter 134 which removes fine dust and bacteria and a blower 135 which flows air may be provided on a flow path through which air flows.

An EVA core 136 which cools air by exchanging heat with refrigerant to perform cooling in the cooling mode and a heater core 137 which heats air in the heating mode may be provided.

The vehicle air conditioning device 130 may include a flow path which supplies air-conditioned air to the station 240. Furthermore, the second control valve 139 which may open or close the flow path may be provided on the flow path. The master 310 may control the air flow introduced into the building 200 from the vehicle air conditioning device 130 through the opening and closing control of the second control valve 139.

The vehicle 100 may be provided with a connection portion 201 which is docked and connected to the station 240, and into which the air conditioned by the vehicle air conditioning device 130 is introduced by the station 240.

Figure 3:
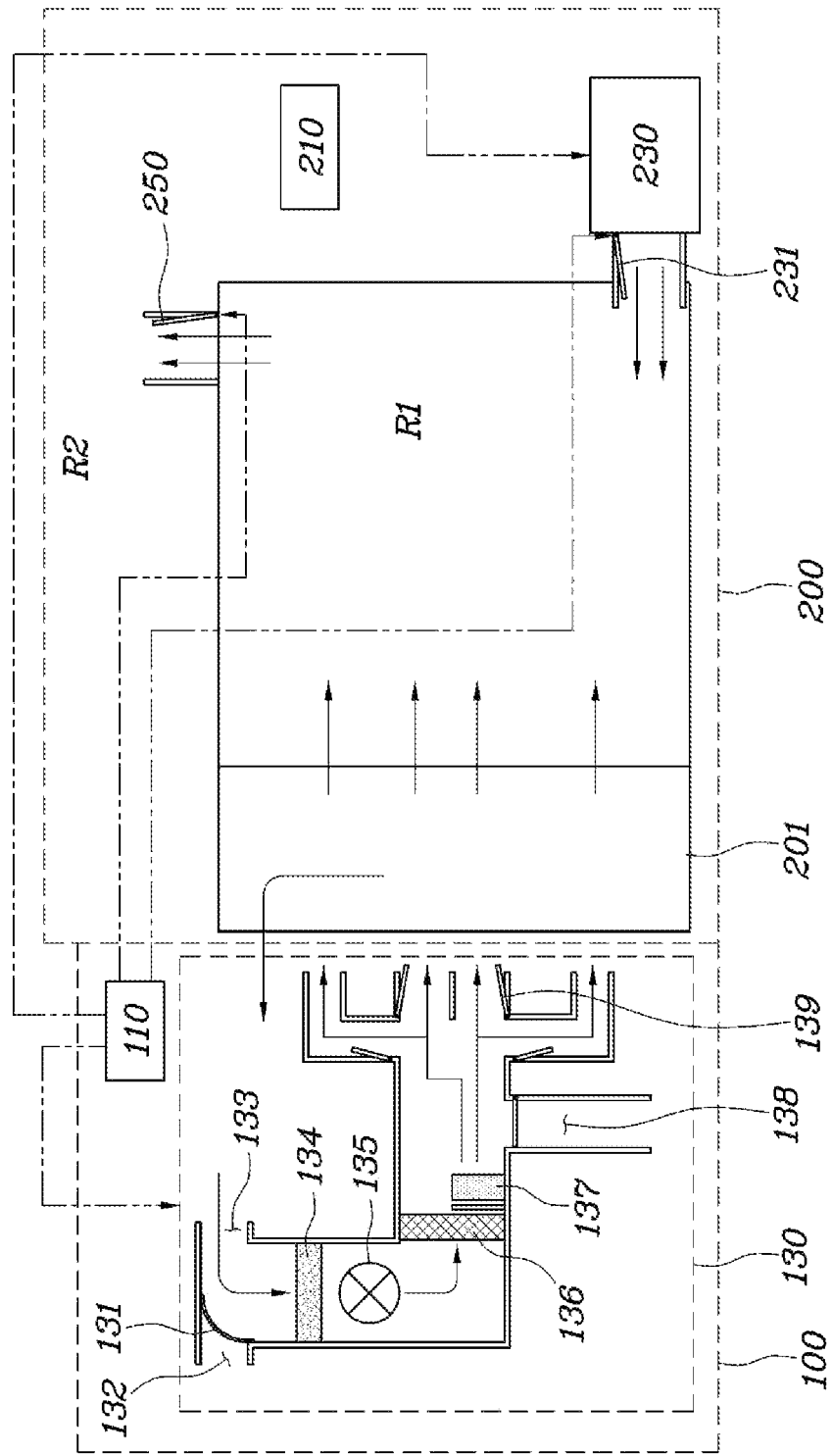
FIG. 3 is a diagram illustrating a state where the vehicle and building integrated air conditioning system according to various exemplary embodiments of the present invention operates a cooling mode if a vehicle control unit is a master.
Figure 4:
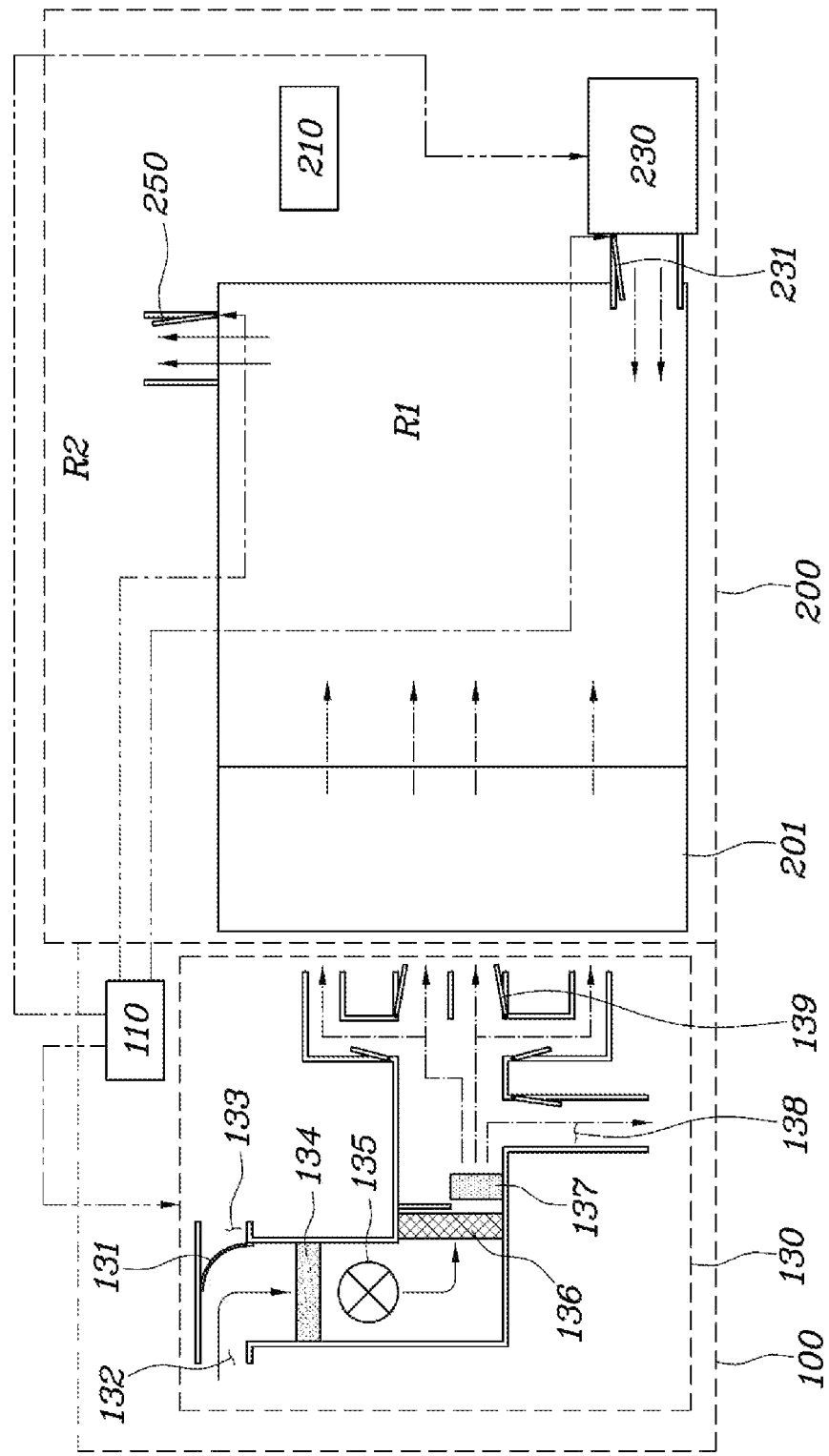
FIG. 4 is a diagram illustrating a state where the vehicle and building integrated air conditioning system according to various exemplary embodiments of the present invention operates a heating mode if the vehicle control unit is a master.

FIG. 3 is a diagram illustrating a state where the vehicle 100 and building integrated air conditioning system according to various exemplary embodiments of the present invention operates a cooling mode if the vehicle control unit 110 is the master 310, and FIG. 4 is a diagram illustrating a state where the vehicle 100 and building integrated air conditioning system according to various exemplary embodiments of the present invention operates a heating mode if the vehicle control unit 110 is the master 310.

Referring to FIG. 3 and FIG. 4, if the vehicle control unit 110 is the master 310, the vehicle control unit 110 may control the vehicle air conditioning device 130, the building air conditioning device 230, the first control valve 250, and the second control valve 139.

In the cooling mode illustrated in FIG. 3, the air door 131 may be operated in the inside air circulation mode by closing the outside air inlet 132. It is possible to prevent the excessive energy consumption caused during cooling through the inside air circulation. The air passes through the EVA core 136 and is cooled and then is introduced into each room, and the air conditioner may be operated in the building air conditioning device 230.

Furthermore, in the heating mode illustrated in FIG. 4, the air door 131 may be operated in the outside air circulation mode by closing the inside air inlet 133. A humidity control is possible through the outside air circulation to keep the room comfortable. The air passes through the heater core 137 and is heated and then is introduced into each room, and in the building air conditioning device 230, the heater may be operated.

The vehicle air conditioning device 130 may be provided with a dehumidification duct 138 which is a flow path through which warm air flows into the vehicle 100 for dehumidification. In the cooling mode, the dehumidification duct 138 is closed, and in the heating mode, the dehumidification duct 138 is opened, so that warm air may be introduced into the vehicle 100 to perform the humidity control.

Figure 5:
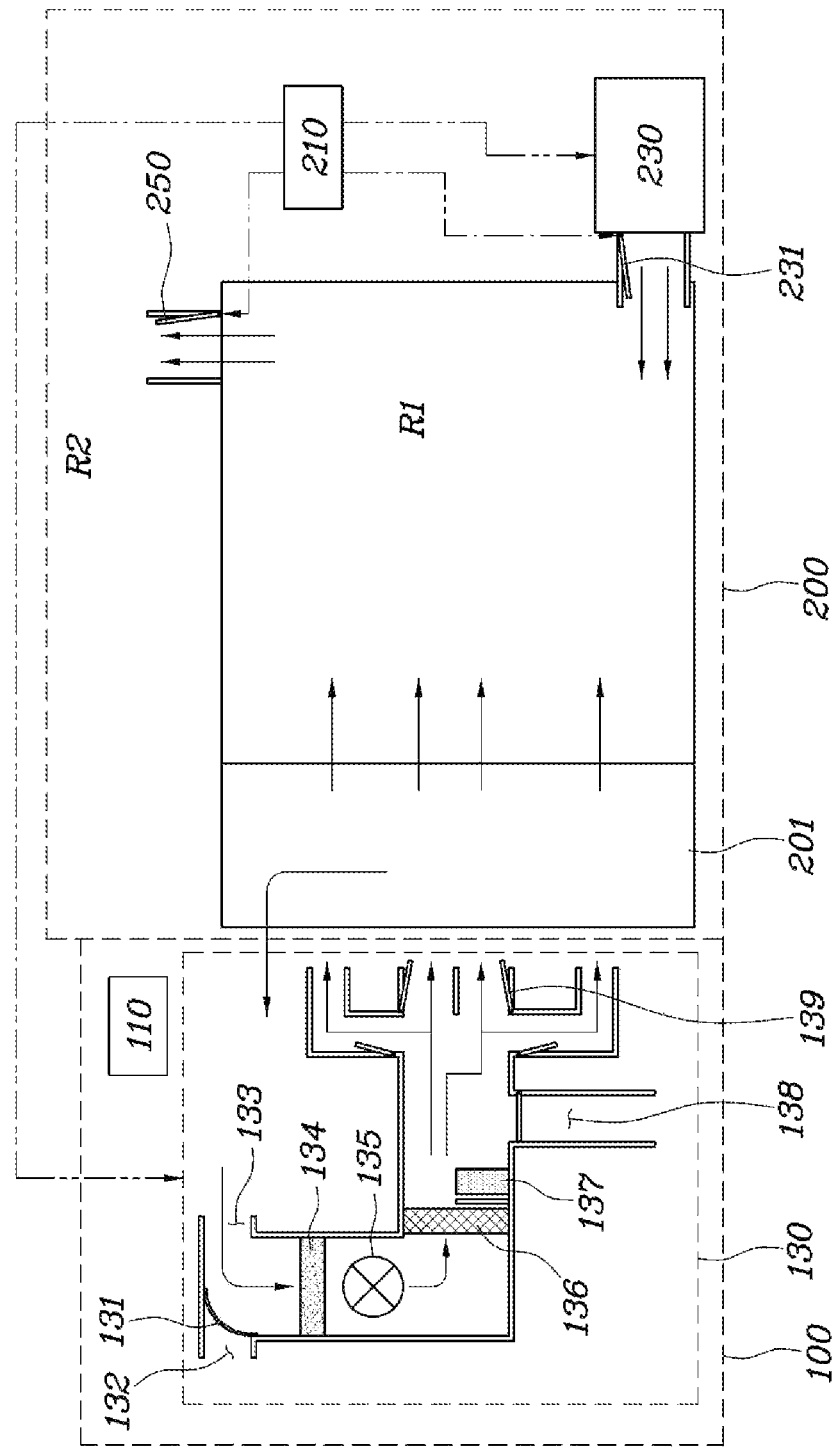
FIG. 5 is a diagram illustrating a state where the vehicle and building integrated air conditioning system according to various exemplary embodiments of the present invention operates a cooling mode if a building control unit is a master.
Figure 6:
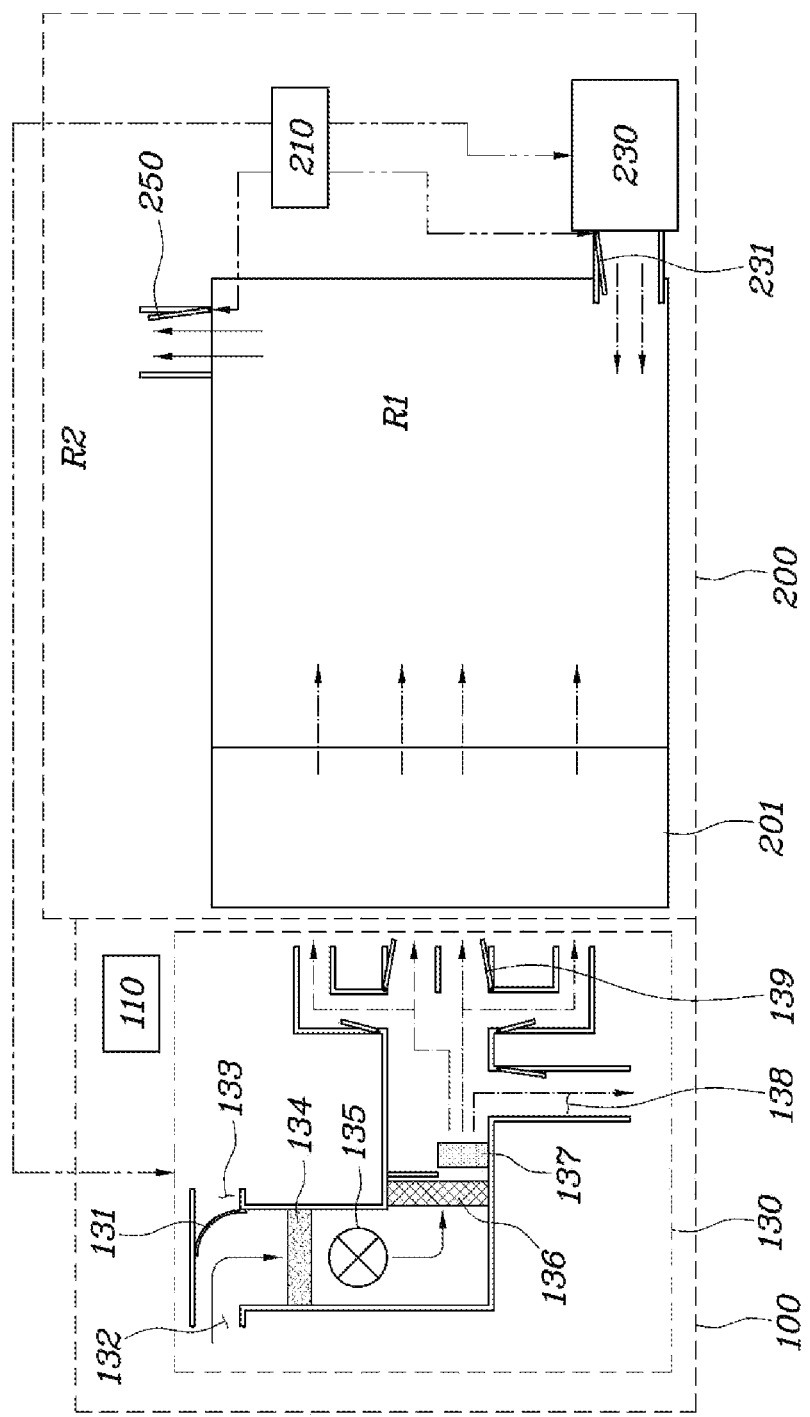
FIG. 6 is a diagram illustrating a state where the vehicle and building integrated air conditioning system according to various exemplary embodiments of the present invention operates a heating mode if the building control unit is a master.

FIG. 5 is a diagram illustrating a state where the vehicle 100 and building integrated air conditioning system according to the exemplary embodiment of the present invention operates the cooling mode if the building control unit 210 is the master 310, and FIG. 6 is a diagram illustrating a state where the vehicle 100 and building integrated air conditioning system according to the exemplary embodiment of the present invention operates the heating mode if the building control unit 210 is the master 310.

Referring to FIG. 5 and FIG. 6, if the building control unit 210 is the master 310, the building control unit 210 may control the vehicle air conditioning device 130, the building air conditioning device 230, the first control valve 250, and the second control valve 139. The specific cooling mode and heating mode are the same as those in the case where the vehicle control unit 110 is the master 310.

As described above, according to the vehicle 100 and building integrated air conditioning system according to various exemplary embodiments of the present invention, a new model configured for performing the internal air conditioning which efficiently utilizes the energy through the integrated air conditioning may be provided.

Hereinafter, a control method of the vehicle 100 and building integrated air conditioning system according to various exemplary embodiments of the present invention will be described. A detailed description of the contents overlapping with the aforementioned description will be omitted.

Figure 7:
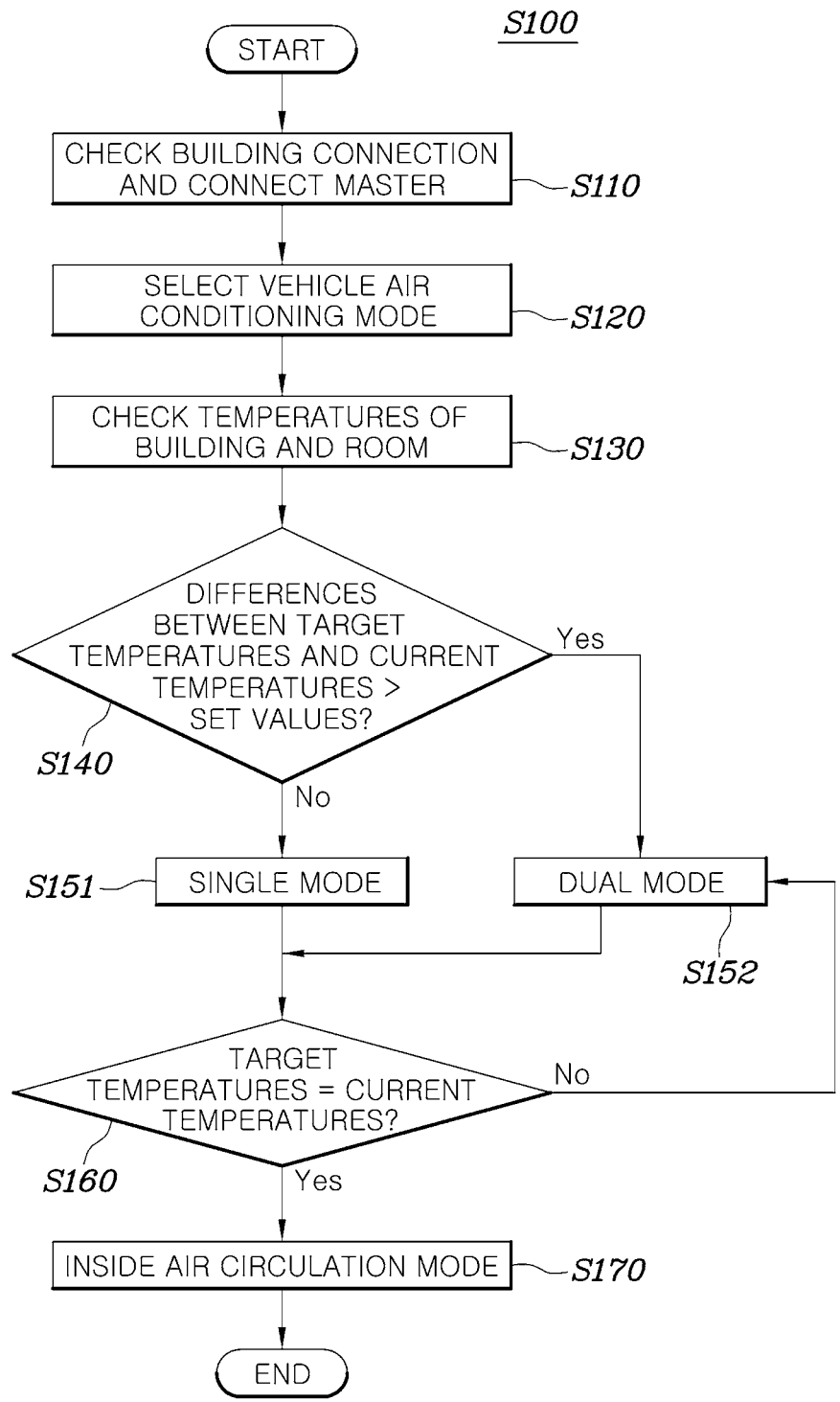
FIG. 7 is a flowchart illustrating a control method of a vehicle and building integrated air conditioning system according to various exemplary embodiments of the present invention.

FIG. 7 is a flowchart illustrating a control method (S100) of the vehicle 100 and building integrated air conditioning system according to various exemplary embodiments of the present invention. The control method (S100) of the vehicle 100 and building integrated air conditioning system according to the various exemplary embodiments of the present invention will be described with reference to FIG. 7.

Checking a connection (S110) may check whether the vehicle 100 is connected, when the vehicle 100 is docked to the building 200. The checking of the connection (S110) may also check whether the sealing member has properly sealed the vehicle 100 and the building 200. If it is determined that the vehicle 100 is properly connected, the integrated control portion 300 may select and connect the master 310 from the vehicle control unit 110 or the building control unit 210.

Selecting an air conditioning mode (S120) may select an air conditioning mode of the vehicle 100 as an inside air circulation mode or an outside air circulation mode, and select a cooling mode or a heating mode. In the case of performing cooling, the inside air circulation mode may be selected for efficiently using energy, and in the case of performing heating, the outside air circulation mode may be selected for the humidity control.

Measuring a temperature (S130) may measure current temperatures by checking a temperature of a building 200 and a temperature of a room of the building to be used. Since the temperature of the room in addition to the temperature of the building 200 may be checked together to control the temperature for each area in the space being used, there is an advantage configured for efficiently performing the heat management.

Determining the temperature (S140) may determine whether differences between target temperatures and the current temperatures are set values or more by comparing the target temperatures with the current temperatures. The target temperatures may be set in advance.

Executing air conditioning may execute air conditioning for the internal spaces. In the determining of the temperature (S140), if it is determined that the difference therebetween are the set values or more, the air conditioning may be executed in a dual mode in which the vehicle air conditioning device 130 and the building air conditioning device 230 are simultaneously operated (S152), and if it is determined that the difference therebetween are the set values or less, the air conditioning may be executed in a single mode in which only one of the vehicle air conditioning device and the building air conditioning device is operated (S151).

Managing the temperature (S160) may stop the operations of the vehicle air conditioning device 130 and the building air conditioning device 230 if the target temperatures and the current temperatures are the same as each other after the air conditioning is executed, and execute the air conditioning in the dual mode if the target temperatures and the current temperatures are different from each other (S152).

Meanwhile, the control method may include an energy saving mode (S170) in which the vehicle air conditioning device 130 is operated in the inside air circulation mode if the target temperatures and the current temperatures are the same as each other in the managing of the temperature (S160).

Figure 8:
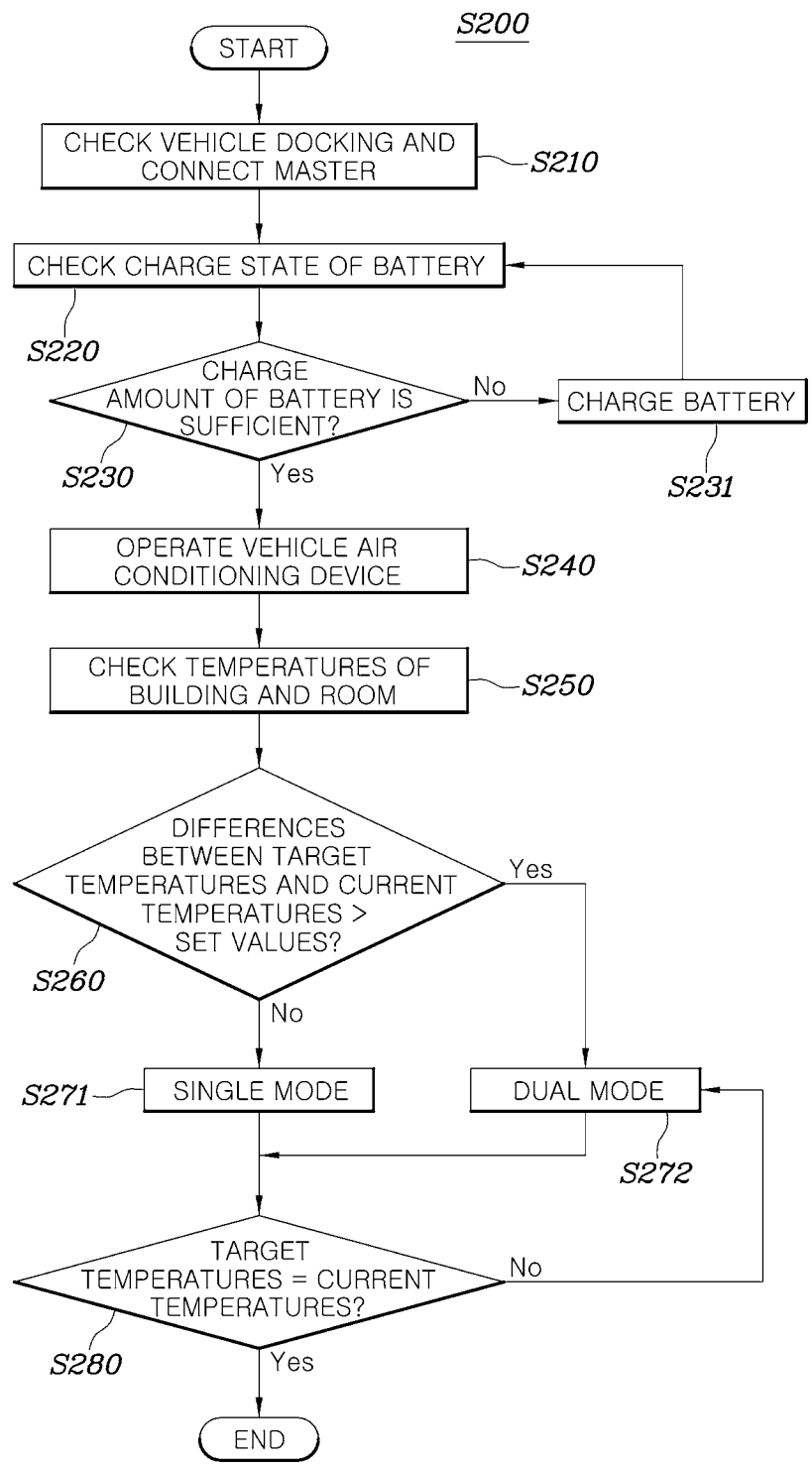
FIG. 8 is a flowchart illustrating a control method of a vehicle and building integrated air conditioning system according to various exemplary embodiments of the present invention.

FIG. 8 is a flowchart illustrating a control method (S200) of the vehicle 100 and building integrated air conditioning system according to various exemplary embodiments of the present invention. The control method (S200) of the vehicle 100 and building integrated air conditioning system according to the various exemplary embodiments of the present invention will be described with reference to FIG. 8.

Checking a connection (S210) may check a connection state of the vehicle 100, and determine the master 310 as in the case of the checking of the connection (S110) in the various exemplary embodiments.

Checking the battery 120 (S220) may check the charge amount of the battery 120. The checking of the battery 120 (S220) may confirm how much the battery 120 is left based on the fully charged capacity.

Determining the charge amount of the battery 120 (S230) may determine whether the charge amount left in the battery 120 is sufficient. Whether the charge amount is sufficient may be determined based on a predetermined value of the charge amount of the battery 120, and the predetermined value may be set in advance. If the charge amount of the battery 120 is the predetermined value or less, charging the battery 120 (S231) which charges the battery 120 by connecting the power supply device 220 of the building 200 with the battery 120 may be performed.

If the charge amount of the battery 120 is sufficient as the predetermined value or more, operating the air conditioning device (S240) which operates the air conditioning device of the vehicle 100 may be performed. The operating of the air conditioning device (S240) may include selecting the air conditioning mode of the vehicle 100 as an inside air circulation mode or an outside air circulation mode and selecting a cooling mode or a heating mode.

Measuring a temperature (S250) may measure current temperatures by checking the temperature of the building 200 and the temperature of the room to be used as in the measuring of the temperature (S130) in the various exemplary embodiments.

Determining the temperature (S260) may determine whether differences between target temperatures and the current temperatures are set values or more by comparing the target temperatures with the current temperatures.

Executing air conditioning (S270) may execute air conditioning for the internal spaces. If it is determined that the differences therebetween are the set values or more in the determining of the temperature (S260), the air conditioning may be executed in the dual mode in which the vehicle air conditioning device 130 and the building air conditioning device 230 are simultaneously operated (S272), and if it is determined that the difference therebetween are the set values or less, the air conditioning may be executed in the single mode in which only one of the vehicle air conditioning device and the building air conditioning device is operated (S271).

Managing the temperature (S280) may stop the operation if the target temperatures and the current temperatures are the same as each other after the air conditioning is executed, and execute the air conditioning in the dual mode if the target temperatures and the current temperatures are different from each other (S272).

Furthermore, the term "controller", "control unit" or "control portion" refer to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle and building integrated air conditioning system which fluidically communicates internal spaces of a vehicle and a building with each other when the vehicle is docked to the building to integrally perform air conditioning, the vehicle and building integrated air conditioning system comprising:
    the vehicle which includes a vehicle control unit configured of controlling a vehicle air conditioning device in the vehicle;
    the building which includes a building control unit configured of controlling a building air conditioning device, is provided with a station to which the vehicle is configured to be docked, and fluidically communicates an interior of the building with the vehicle to perform the air conditioning when the vehicle is docked to the station; and
    an integrated control portion which is electrically connected to the vehicle control unit and the building control unit and configured to allow the vehicle control unit or the building control unit to integrally control the vehicle air conditioning device and the building air conditioning device,
    wherein the integrated control portion is configured to set target temperatures of the internal spaces of the building and the vehicle, to control so that the air conditioning is executed in a dual mode in which the vehicle air conditioning device and the building air conditioning device are operated when differences between the target temperatures and current temperatures are equal to or greater than predetermined values by checking the current temperatures, and to control so that the air conditioning is executed in a single mode in which one of the vehicle air conditioning device and the building air conditioning device is operated if the differences therebetween are equal to or less than the predetermined values.

2. The vehicle and building integrated air conditioning system according to claim 1,
    wherein when the vehicle is docked to the building, the integrated control portion is configured to check a charge state of a battery of the vehicle, and is connected to a power supply device of the building when a charge amount of the battery is equal to or less than a predetermined value to charge the battery.

3. The vehicle and building integrated air conditioning system according to claim 1,
    wherein the internal space of the building is provided with a plurality of rooms which are partitioned into a plurality of spaces, and a first control valve is provided in the building so that the plurality of rooms selectively fluidically-communicate with each other via the first control valve.

4. The vehicle and building integrated air conditioning system according to claim 3,
    wherein the integrated control portion is configured to control opening and closing of the first control valve to adjust a room in which the air conditioning is performed among the plurality of rooms.

5. The vehicle and building integrated air conditioning system according to claim 1,
    wherein an outside wall of the station of the building is provided with a sealing member which seals in contact with a frame of the vehicle to be docked.

6. The vehicle and building integrated air conditioning system according to claim 1,
    wherein the integrated control portion is configured to continuously check the current temperatures after the air conditioning is executed, to stop operations of the vehicle air conditioning device and the building air conditioning device when the target temperatures and the current temperatures are a same as each other, and to control so that the air conditioning is executed in the dual mode when the target temperatures and the current temperatures are different from each other.

7. The vehicle and building integrated air conditioning system according to claim 1, wherein the integrated control portion is configured to control so that the air conditioning is executed by selecting an inside air circulation mode or an outside air circulation mode as an air conditioning mode of the vehicle.

8. The vehicle and building integrated air conditioning system according to claim 7,
wherein the vehicle air conditioning device includes: an air door which is configured to selectively open or close an outside air inlet and an inside air inlet of the vehicle air conditioning device, and
wherein the integrated control portion is configured to control the air door to select the inside air circulation mode in a cooling mode, and select the outside air circulation mode in a heating mode.

9. The vehicle and building integrated air conditioning system according to claim 7,
wherein the integrated control portion is configured to continuously check the current temperatures after the air conditioning is executed, and to control so that the vehicle air conditioning device is operated in the inside air circulation mode when the target temperatures and the current temperatures are a same as each other.

10. The vehicle and building integrated air conditioning system according to claim 1,
wherein the vehicle air conditioning device includes:
a flow path which supplies air-conditioned air to the station; and
a second control valve which is configured to open or close the flow path is provided on the flow path.

11. The vehicle and building integrated air conditioning system according to claim 1,
wherein the integrated control portion is configured to control so that one of the vehicle control unit or the building control unit becomes a master which is authorized to integrally control the vehicle air conditioning device and the building air conditioning device, and to control so that the other one of the vehicle control unit or the building control unit becomes a slave which is not authorized to control the vehicle air conditioning device and the building air conditioning device.

12. A control method of the vehicle and building integrated air conditioning system according to claim 1, the control method including:
checking, by the integrated control portion, a connection in which whether the vehicle is connected to the building is checked, when the vehicle is docked to the building;
selecting, by the integrated control portion, an air conditioning mode of the vehicle as an inside air circulation mode or an outside air circulation mode;
measuring, by the integrated control portion, the current temperatures by checking a temperature of the building and a temperature of a room of the building to be used;
determining, by the integrated control portion, whether the differences between the target temperatures and the current temperatures are equal to or greater than the predetermined values by comparing the target temperatures with the current temperatures; and
executing, by the integrated control portion, the air conditioning in the dual mode in which the vehicle air conditioning device and the building air conditioning device are operated when the differences between the target temperatures and the current temperatures are equal to or greater than the predetermined values, and the air conditioning in the single mode in which one of the vehicle air conditioning device and the building air conditioning device is operated when the differences therebetween are equal to or less than the predetermined values.

13. The control method according to claim 12, further including:
stopping, by the integrated control portion, operations of the vehicle air conditioning device and the building air conditioning device when the target temperatures and the current temperatures are a same as each other, and executing the air conditioning in the dual mode when the target temperatures and the current temperatures are different from each other, after the executing of the air conditioning.

14. The control method according to claim 13,
wherein the vehicle air conditioning device is controlled to operate in the inside air circulation mode when the target temperatures and the current temperatures are a same as each other in the stopping of the operations.

15. The control method according to claim 12, further including:
checking, by the integrated control portion, a charge state of a battery of the vehicle after the checking of the connection;
determining, by the integrated control portion, whether a charge amount of the battery is equal to or greater than a predetermined charge amount; and
charging, by the integrated control portion, the battery by connecting a power supply device of the building with the battery when the charge amount of the battery is the predetermined charge amount or less.

16. The control method according to claim 12,
wherein the checking of the connection includes: selecting one of the vehicle control unit or the building control unit as a master.

17. The method of claim 12, wherein the integrated control portion includes:
a processor; and
a non-transitory storage medium on which a program for performing the method of claim 12 is recorded and executed by the processor.

18. A non-transitory computer readable medium on which a program for performing the method of claim 12 is recorded.

* * * * *